United States Patent
Kondo et al.

(10) Patent No.: US 9,372,268 B2
(45) Date of Patent: Jun. 21, 2016

(54) METHOD FOR ERASING BRIGHT BURN AND RADIOGRAPHIC IMAGING DEVICE HAVING BRIGHT BURN-ERASING FUNCTION

(71) Applicant: Konica Minolta, Inc., Tokyo (JP)

(72) Inventors: Masashi Kondo, Hachioji (JP); Kei Isoda, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/529,955

(22) Filed: Oct. 31, 2014

(65) Prior Publication Data
US 2015/0129783 A1    May 14, 2015

(30) Foreign Application Priority Data
Nov. 14, 2013    (JP) .................. 2013-235740

(51) Int. Cl.
G01N 23/04    (2006.01)
G01T 1/20    (2006.01)

(52) U.S. Cl.
CPC ........................................ *G01T 1/20* (2013.01)

(58) Field of Classification Search
CPC .......... G01T 1/2016; G01T 7/005; G01T 1/20
USPC ....................................................... 250/588
See application file for complete search history.

(56) References Cited

U.S. PATENT DOCUMENTS

| | | | | |
|---|---|---|---|---|
| 5,514,298 A | * | 5/1996 | Terrell | C09K 11/7733 250/483.1 |
| 6,078,053 A | * | 6/2000 | Adam | G03G 13/054 250/370.08 |
| 6,310,351 B1 | * | 10/2001 | Zur | G03G 15/054 250/370.08 |
| 6,504,169 B1 | * | 1/2003 | Leblans | A61B 6/4216 250/582 |
| 6,730,243 B2 | * | 5/2004 | Leblans | G21K 4/00 252/301.4 H |
| 2002/0079458 A1 | * | 6/2002 | Zur | G01T 1/2018 250/370.11 |
| 2003/0043959 A1 | | 3/2003 | Wischmann et al. | |
| 2003/0063708 A1 | * | 4/2003 | Shoji | A61B 6/4291 378/154 |
| 2004/0217294 A1 | * | 11/2004 | Zur | G01T 1/2018 250/370.09 |
| 2005/0161610 A1 | * | 7/2005 | Spahn | A61B 6/583 250/370.09 |
| 2010/0116996 A1 | * | 5/2010 | Poorter | G01T 1/2018 250/368 |
| 2011/0001052 A1 | * | 1/2011 | Struye | G01T 1/2014 250/369 |
| 2011/0110497 A1 | * | 5/2011 | Nishino | A61B 6/04 378/98.8 |
| 2014/0001367 A1 | * | 1/2014 | Anzai | G01T 1/2006 250/366 |
| 2014/0107463 A1 | | 4/2014 | Nishino et al. | |

FOREIGN PATENT DOCUMENTS

| | | |
|---|---|---|
| JP | 2003-107163 A | 4/2003 |
| JP | 4790863 B2 | 7/2011 |
| JP | 2012-028617 A | 2/2012 |
| WO | WO2013/002327 A1 | 3/2013 |

\* cited by examiner

*Primary Examiner* — David J Makiya
*Assistant Examiner* — Taeho Jo
(74) *Attorney, Agent, or Firm* — Lucas & Mercanti, LLP

(57) ABSTRACT

A method for erasing bright burn includes: applying, to a scintillator, visible light having an intensity peak at a wavelength in the range of 405 nm to 500 nm, wherein the scintillator includes cesium iodide and is provided in a radiographic imaging device having a photoelectric transducer.

14 Claims, 6 Drawing Sheets

METHOD FOR ERASING BRIGHT BURN AND RADIOGRAPHIC IMAGING DEVICE HAVING BRIGHT BURN-ERASING FUNCTION

The entire disclosure of Japanese Patent Application No. 2013-235740 filed on Nov. 14, 2013 including description, claims, drawings, and abstract are incorporated herein by reference in its entirety.

BACKGROUND OF THE INVENTION

1. Field of the Invention

The present invention relates to a method for erasing bright burn that occurs in a radiographic imaging device. The present invention also relates to a radiographic imaging device having the function of erasing such bright burn. More specifically, the present invention relates a method for erasing bright burn using specific visible light when the bright burn occurs in a radiographic imaging device, and to a radiographic imaging device having the function of erasing bright burn by means of such visible light.

2. Description of the Related Art

Conventional radiographic images such as X-ray images are widely used for diagnosis of diseases in medical practice. In particular, radiographic images produced with screen-film systems have been improved to have higher sensitivity and quality over a long period of history, so that they are still used as high-reliability, high-cost-performance imaging systems in medical practice around the world. However, the information of these images is what is called analog image information, which cannot be freely subjected to image processing or instantly transmitted electronically, in contrast to digital image information, which continues to progress in recent years.

In recent years, therefore, digital radiographic detectors are appearing such as computed radiography (CR) systems and flat panel radiography detectors (flat panel detectors (FPDs)). Using these devices, digital radiographic images are directly obtained, which can be directly displayed on a cathode ray tube or an image display such as a liquid crystal panel. Such images do not always have to be formed on photographic films. Therefore, such X-ray image detectors reduce the need to form silver-halide photographic images and significantly improve the convenience of diagnosis in hospitals and clinics.

Computed radiography (CR) is now accepted as a digital X-ray imaging technique in medical practice. However, computed radiography (CR) does not have enough sharpness or special resolution, and its image quality does not reach the level of the screen-film systems. Newly developed digital X-ray imaging technologies include flat panel detectors (FPDs) using thin film transistors (TFTs), such as those described in John Rowlands, "Amorphous Semiconductor Usher in Digital X-ray Imaging", Nov. 1997, Physics Today, p. 24, and L. E. Antonuk, "Development of a High Resolution, Active Matrix, Flat-Panel Imager with Enhanced Fill Factor", SPIE Vol. 3032, p. 2 (1997).

Besides such medical applications, radiographic imaging technology is also used in non-destructive testing. Non-destructive testing is a technique to detect harmful flaws in mechanical parts or structures without destroying the objects. In such non-destructive testing, screen-film systems and X-ray irradiation of objects have also been used to form radiographic images for use in detecting flaws in the objects. However, such testing has a problem in that the resulting images are analog and cannot be freely subjected to image processing or instantly transmitted electronically, in contrast to digital image information. In recent years, therefore, digital radiographic detectors such as computed radiography (CR) systems and flat panel radiography detectors (flat panel detectors (FPDs)) have been increasingly used.

John Rowlands, "Amorphous Semiconductor Usher in Digital X-ray Imaging," Nov. 1997, Physics Today, p. 24, and L. E. Antonuk, "Development of a High Resolution, Active Matrix, Flat-Panel Imager with Enhanced Fill Factor," SPIE Vol. 3032, p. 2 (1997) show the use of cesium iodide (CsI) as an unit for producing visible light from X-rays. Cesium iodide (CsI) converts X-rays to visible light with relatively high efficiency. Therefore, a flat panel using cesium iodide (CsI) in combination with thin film transistors (TFTs) attracts attention as a high-sensitivity X-ray image visualizing system.

Unfortunately, when a large amount of X-rays are applied to a CsI scintillator, a temporary increase in sensitivity (bright burn effect) occurs in the CsI scintillator, so that an artifact or afterglow appears in FPD images. The increased sensitivity returns to the original level as time elapses. However, this problem is difficult to address using FPD gain correction (sensitivity correction) every time imaging is performed. In addition, the sensitivity increase occurs non-uniformly in the image region and can lead to a problem such as a reduction in contrast or image degradation. Therefore, improvements have been demanded.

To overcome such a bright burn effect, JP 2003-107163 A discloses a method of heating a scintillator to prevent a bright burn effect.

However, when such heating is used to erase the generated bright burn effect, it takes a long time to heat and cool the scintillator. Therefore, this method is not suitable for applications where a scintillator is repeatedly used for short periods of time.

JP 4790863 B1 discloses that ultraviolet light is applied to a scintillator through a large number of small holes formed in a reflecting plate so that the scintillator can be refreshed and thus a bright burn effect can be prevented.

However, such application of ultraviolet light to a scintillator causes a new problem such as a reduction in the sensitivity of the scintillator itself although bright burn might be erased by the application of ultraviolet light. First of all, JP 4790863 B1 never discloses any data showing whether or not bright burn is effectively erased, and does not demonstrate that the erasing effect is really achieved.

Thus, there has been proposed no effective method to prevent bright burn in a scintillator.

JP 2012-28617 A discloses a radiographic imaging device including a photoelectric transducer for converting incident X-rays to light and generating charges in response to the light, a transistor for outputting a detection signal generated in the photoelectric transducer, and a converter for converting the X-rays incident on the transistor to ultraviolet light (10 to 400 nm in wavelength).

The converter (ultraviolet scintillator) converts X-rays incident on the radiographic imaging device to ultraviolet light and applies the ultraviolet light to the transistor (TFT) to refresh the charges remaining in the TFT, so that the TFT threshold is reset to the normal value, which makes it possible to obtain an output signal from the TFT under constant conditions.

Therefore, the device is characterized in that the TFT threshold can be reset to the normal value by applying ultraviolet light to the TFT. However, JP 2012-28617 A discloses nothing about what effect the ultraviolet light will have on a scintillator when the ultraviolet light is applied to the scintillator converting the incident X-rays to visible light.

As a result of studies, the inventors have found that in some cases, when ultraviolet light is applied to a scintillator converting X-rays to visible light, the sensitivity of the scintillator decreases.

L. Trefilova, B. Grinyov, L. Kovaleva, N. Kosinov, O. Shpylynska, "Transformation of defects arising in CsI(Tl) crystals under daylight", Phys. Stat. Sol., 2(1), p 101-(2005) shows in FIG. 2 that a long-lasting afterglow appears when mercury lamp beams containing ultraviolet components (253.7 nm and 365.0 nm) are applied to cesium iodide crystals with no filter. Specifically, in the drawing where ln(t) represents the natural logarithm of emission attenuation time (seconds) and ln(I) represents the natural logarithm of emission intensity, the light emission continues even after ln(t)=6, namely, t=403 seconds, which is considered to show the presence of afterglow. Like the bright burn effect, the afterglow is a type of delayed light emission and will be a cause of contrast-reduction-induced degradation of images. Therefore, the drawing is considered to show unfavorable results.

M. A. H. Chowdhury, D. C. Imrie, "Thermal annealing and optical darkening effects in CsI(Tl) crystals", Nucl. Inst. Methods Phys. Res. A, 432, p 138-(1999) states in Introduction that defects produced by coloration induced by ultraviolet light as well as gamma-rays can move in a high-temperature environment, which suggests that ultraviolet irradiation can cause the coloration of crystals and the formation of defects. It is well known that the presence of defects has an effect on delayed light emission, for example, from V. Babin, K. Kalder, A. Krasnikov, S. Zazubovich, "Luminescence and defects creation under photoexcitation of CsI:Tl crystals in Tl+-related absorption bands", J. Luminescence, 96, p 75-(2002). Therefore, delayed light emission is also considered to cause a reduction in contrast and degradation of image quality.

In order to suppress the degradation of image quality, therefore, the application of ultraviolet light to a scintillator is not preferred, and rather light with a wavelength longer than that of ultraviolet light (or with energy smaller than that of ultraviolet light) should be applied.

WO2013/002327A discloses that the order of a series of imaging steps is so determined that imaging can be performed while avoiding the site where a bright burn effect occurs. This does not make any alterations to the bright burn effect and merely uses a specific order of imaging steps to avoid the bright burn-induced degradation of images.

SUMMARY OF THE INVENTION

An object of the present invention is to provide a method for erasing bright burn in a scintillator provided to convert X-rays to visible light while suppressing degradation of the sensitivity of the scintillator.

Another object of the present invention is to provide a radiographic imaging device having a bright burn-erasing function for use in erasing bright burn, which occurs as described above.

To achieve at least one of the abovementioned objects, according to an aspect, a method for erasing bright burn reflecting one aspect of the present invention comprises applying, to a scintillator, visible light having an intensity peak at a wavelength in the range of 405 nm to 500 nm, wherein the scintillator includes cesium iodide and is provided in a radiographic imaging device having a photoelectric transducer. In the method of the present invention, the radiographic imaging device preferably includes a scintillator including cesium iodide, a photoelectric transducer, and a unit adapted to generate bright burn-erasing light.

In the method of the present invention, the light applied to erase bright burn preferably has an intensity peak at a wavelength in the range of 410 nm to 490 nm.

In the method of the present invention, the light is preferably applied for a period of time in the range of 1 millisecond to 5 seconds to erase bright burn.

In the method of the present invention, the light applied to erase bright burn preferably has an irradiance in the range of $0.1\ \mu W/cm^2$ to $1\ mW/cm^2$.

To achieve at least one of the abovementioned objects, according to an aspect, a radiographic imaging device with a bright burn-erasing function reflecting one aspect of the present invention comprises a scintillator including cesium iodide; a photoelectric transducer configured to detect light emitted from the scintillator and to convert the light to an electrical signal; and a bright burn-erasing unit arranged to apply, to the scintillator, visible light having an intensity peak at a wavelength in the range of 405 nm to 500 nm.

In the device of the present invention, the light applied to erase bright burn preferably has an intensity peak at a wavelength in the range of 410 nm to 490 nm.

In the device of the present invention, the light is preferably applied for a period of time in the range of 1 millisecond to 5 seconds to erase bright burn.

In the device of the present invention, the light applied to erase bright burn preferably has an irradiance in the range of $0.1\ \mu W/cm^2$ to $1\ mW/cm^2$.

In the present invention, the wavelength spectrum of the light applied to erase bright burn generally has a half-width of ±3 nm, preferably ±2 nm or less.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

Next, the method of the present invention for erasing bright burn will be described based on the drawings with reference to devices.

A scintillator including cesium iodide (CsI) as a main component is used in a method of an embodiment of the present invention for erasing bright burn. In such a scintillator, for example, cesium iodide (CsI) doped with thallium (Tl) is preferably used. Such a scintillator can convert X-rays to green light (central wavelength: 550 nm). In this case, the relative content of thallium (Tl) is preferably from 0.1 to 5% by mole. Under such conditions, the relative content of thallium (Tl) in the undercoat layer is preferably from 0.01 to 1% by mole, more preferably from 0.1 to 0.7% by mole. The relative content of the activator is expressed as the percentage of moles of the activator relative to 1 mole of the fluorescent host compound. When the thallium (Tl) content falls within the above ranges, the wavelength of the fluorescence produced by X-ray irradiation can be prevented from shifting, which is advantageous in that the photoelectric transducer can detect the fluorescence with higher accuracy.

As mentioned above, cesium iodide doped with thallium (Tl) can emit green light when irradiated with X-rays. Besides thallium (Tl), cesium iodide may be doped with sodium ions ($Na^+$) or europium ions ($Eu^{2++}$) for the production of colored light from X-rays. In an embodiment of the present invention, therefore, the scintillator including cesium iodide may contain an optional component such as that mentioned above in addition to cesium iodide.

In an embodiment of the present invention, the scintillator described above is placed in a housing when used.

Figure 1:
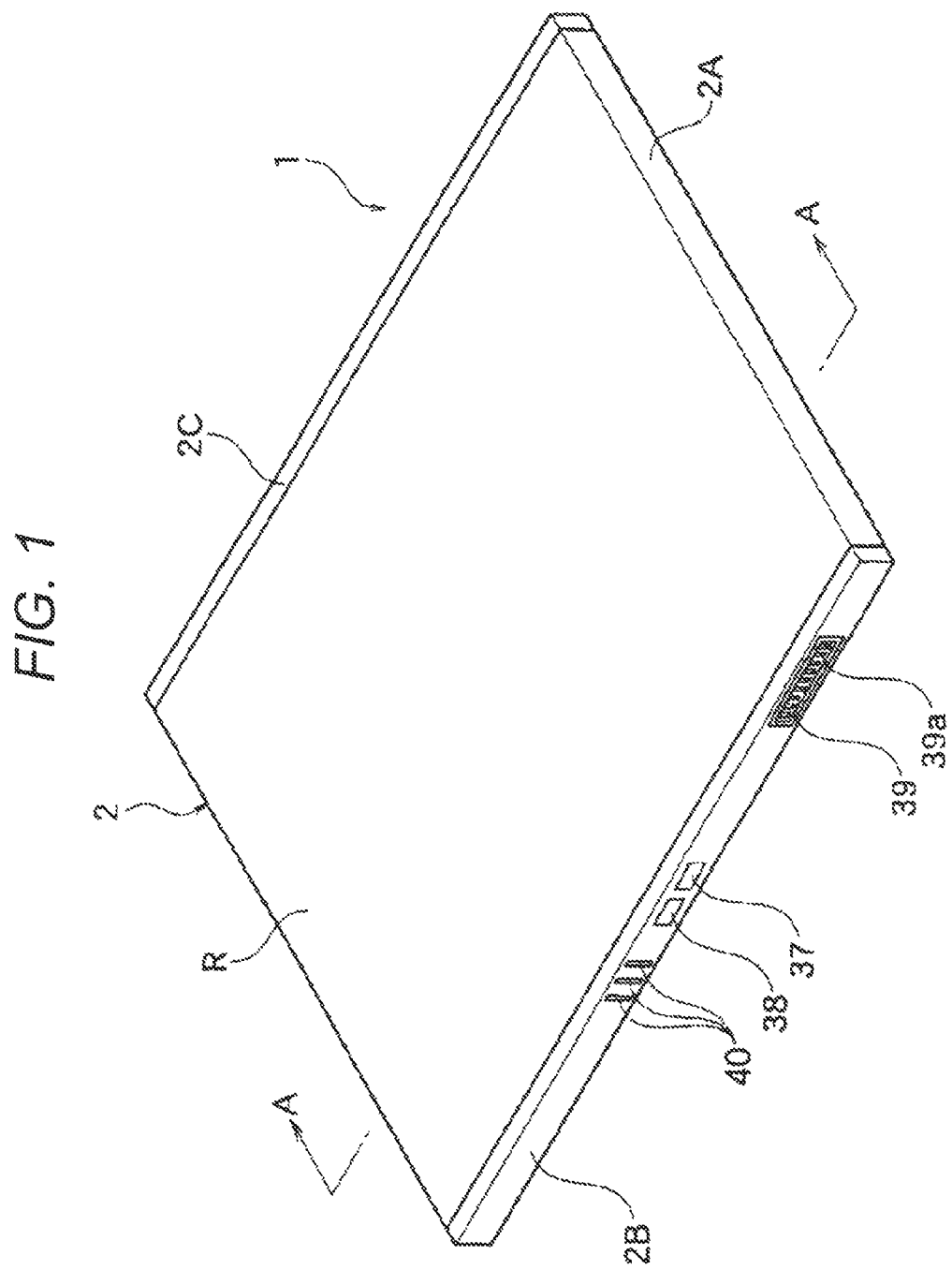
FIG. 1 is a perspective view showing an example of a radiographic imaging device for carrying out the method of the present invention for erasing bright burn.
Figure 2:
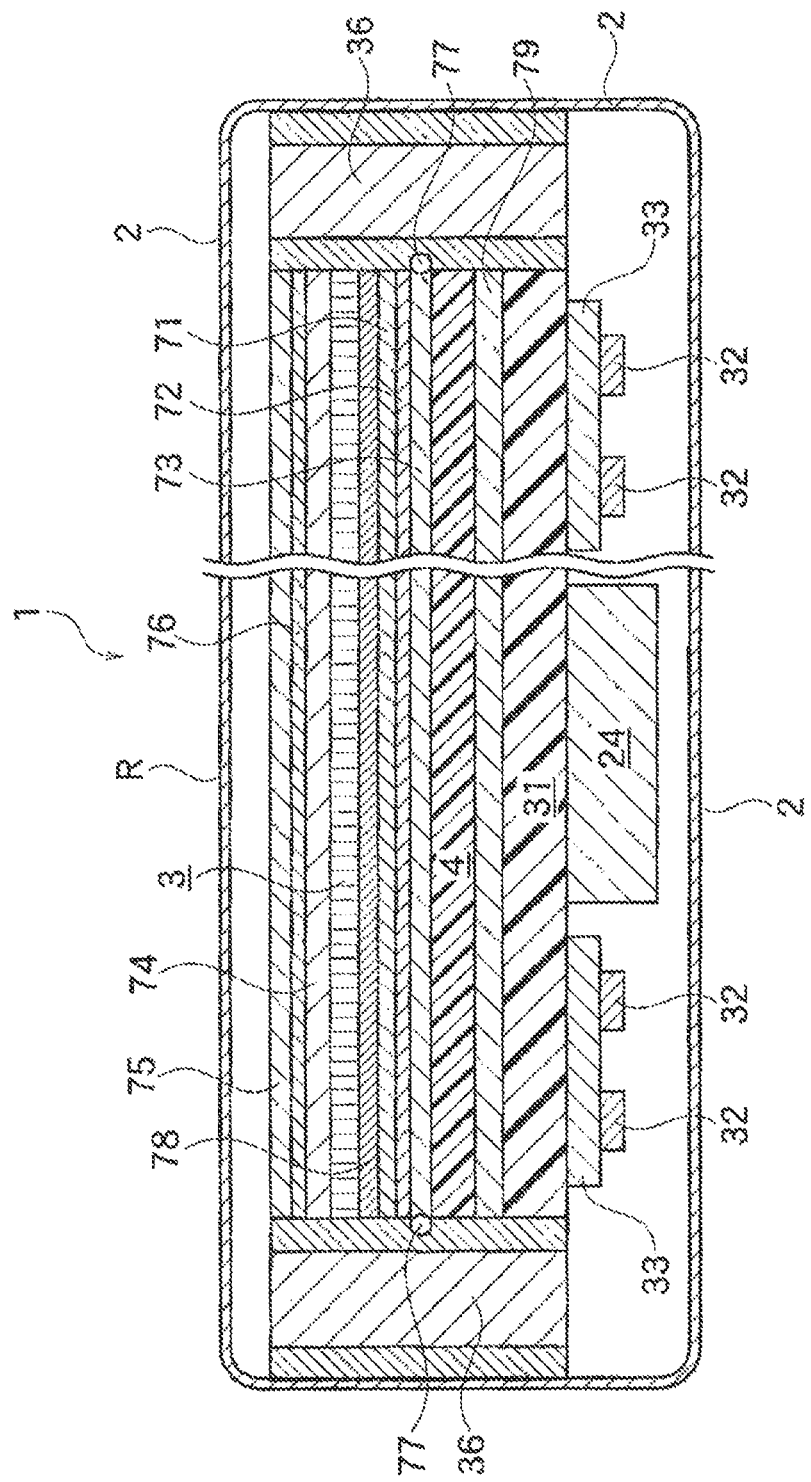
FIG. 2 is a cross-sectional view along A-A of FIG. 1.

FIG. 1 is an outside perspective view showing an example of a radiographic imaging device 1 having the above scintillator placed in a housing, and FIG. 2 is a cross-sectional view along A-A of FIG. 1.

As shown in FIG. 1, the radiographic imaging device 1 includes a sensor panel that is placed in its housing and includes the scintillator 3, a board 4, and other components.

As shown in FIG. 1, the scintillator 3 used in an embodiment of the present invention is placed and used in a housing 2 that includes a housing body 2A and cover members 2B and 2C. The housing body 2A is a square hollow tube having a radiation receiving surface R and openings at both long-side ends. The cover members 2B and 2C are provided to close the openings, respectively, at both ends of the housing body 2A.

The housing body 2A used in this structure is made of, for example, a radiation permeable material such as a carbon plate or a plastic, through which radioactive rays are transmitted. The housing 2 is formed by closing the openings at both ends of the housing body 2A with the cover members 2B and 2C.

It will be understood that the openings may be formed at other places than the long-side ends of the housing body 2A. It will also be understood that the housing 2 may be of other types than the type shown in FIG. 1, what is called a monocoque type. As an alternative to such a monocoque type, for example, what is called a lunch box type may be formed, which includes frame and back plates.

As shown in FIG. 1, the cover member 2B at one end of the housing 2 has a power switch 37, a selecting switch 38, a connector 39 to a cradle and a notification unit, indicators 40, etc. The indicators 40 include LEDs or the like for indicating the state of charge of a built-in battery 24, the state of operation of the radiographic imaging device 1, and so on.

A groove 39a is formed around the connector 39. The groove 39a is so formed that it can be engaged with a protective frame member (not shown), which is formed around a connector of a cradle, when the connector 39 of the radiographic imaging device 1 is connected to the connector of the cradle, which accommodates and charges/discharges the radiographic imaging device 1.

In a preferred mode, the connector 39 can be connected to various types of cables such as communication cables, connectors to be connected with such cables are also provided with protective frame members, respectively, like that of the cradle-side connector, and the groove is so formed that it can also be engaged with these protective frame members.

One end of the cover member 2B or 2C may also include an antenna device (not shown) as a communication unit for wirelessly transferring image data and so on to a console. In this case, although any number of antenna devices may be provided, two or more antenna devices are preferably provided at two or more places so as to conform to various setting conditions. Alternatively, image data and so on may be transferred by cable to the console, and in this case, for example, a cable or the like for transmission/reception may be connected to the connector 39.

As shown in FIG. 2 inside of the housing 2, a base 31 is disposed on the lower side of the board 4 including glass or the like with a lead thin sheet 79 or the like interposed therebetween.

Figure 3:
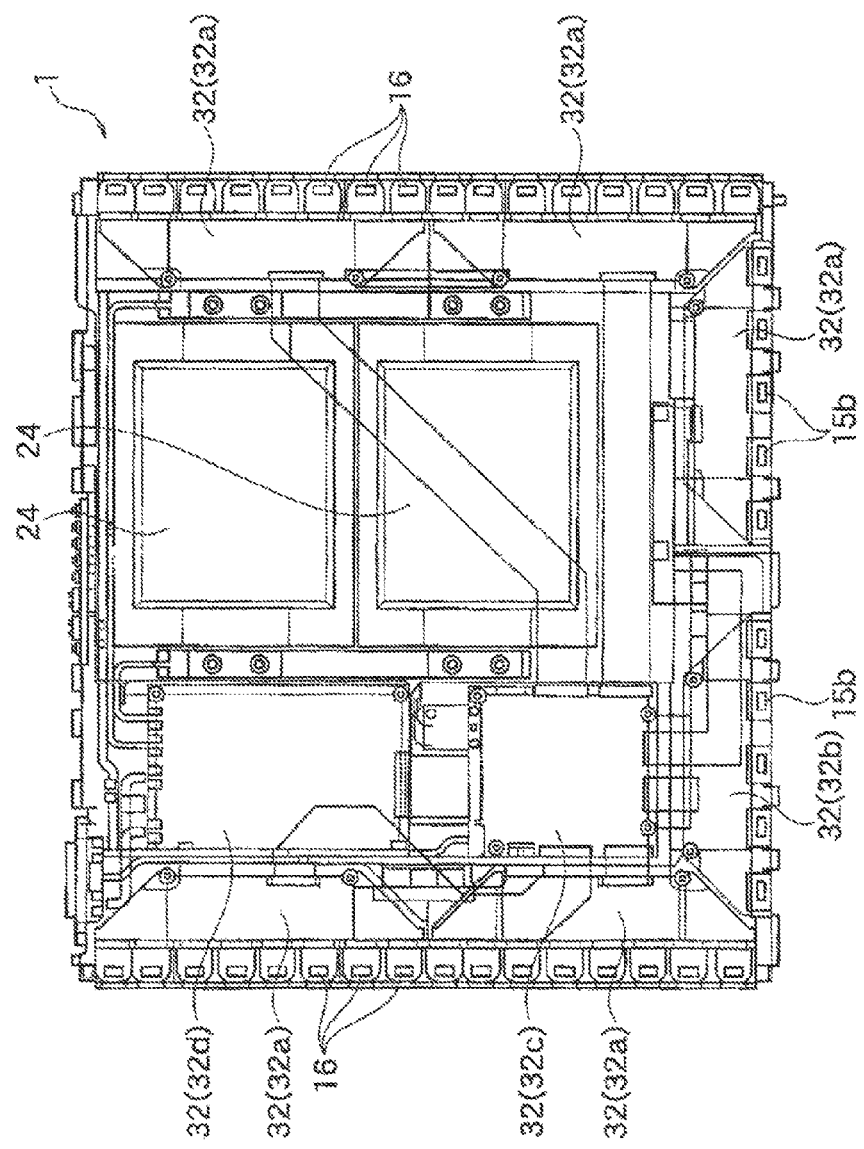
FIG. 3 is a plan view showing a side of the radiographic imaging device opposite to its side to which radioactive rays are to be applied.

As shown in FIG. 3, for example, the base 31 is provided with a PCB board 33, a battery 24 for supplying power to each functional unit of the radiographic imaging device 1, and other components. Electronic components 32 such as signal interface boards 32a, a gate interface board 32b, a control board 32c, and a power supply board 32d are mounted on the PCB board 33. A shock absorber 36 or the like is optionally provided between the base 31 and the inner wall of the housing 2 so that the base 31 is prevented from colliding against the inside of the housing 2 when shock is applied to the sensor panel and so on.

A light guide layer 73 for directing certain visible light to the scintillator 3 is disposed on the surface of the board 4, which is provided on the radiation receiving side R in the radiographic imaging device 1. Light sources 77 for supplying visible light to the light guide layer 73 are provided at both ends of the light guide layer 73.

The light guide layer 73 may be made of any material capable of directing, to the scintillator 3, visible light with a specific wavelength for erasing bright burn generated in the scintillator 3. Preferably, the light guide layer 73 is a layer of optically transparent resin such as polycarbonate or acrylic resin, or made of side-emitting glass fibers. Side-emitting glass fibers may be woven into a sheet-shaped cloth, which may be used as the light guide layer. The thickness of the light guide layer 73 is generally, but not limited to, in the range of 1 to 1,000 μm, preferably in the range of 1 to 500 μm. The light guide layer 73 with such a thickness can uniformly direct light with a specific wavelength from the light sources 77 to the scintillator 3.

When the light guide layer is disposed in this way below the scintillator 3, preferably above and below the scintillator 3, one or more intermediate layers may be formed to prevent corrosion of the light guide layer or to prevent intrusion of the light guide layer material between crystals deposited to form the scintillator 3. Such an intermediate layer can be formed using any of various methods, such as a method of applying or vapor-depositing the material for forming the intermediate layer, a method including forming the material for the intermediate layer into a sheet and then bonding the sheet, and a method including forming a temporary support film, forming a sheet on the temporary support film, then removing the temporary support, and bonding the sheet.

Besides the above structure, the light guide layer may be provided on the surface opposite to the surface in contact with the scintillator so that erasing light can be applied to the scintillator through a TFT glass substrate.

A method of applying visible light with a specific wavelength to the scintillator 3 using the light sources 77 and the light guide layer 73 has been described above. The description of this method is not intended to limit the present invention, and other methods capable of applying visible light with a specific wavelength to the scintillator 3 may also be used.

Cesium iodide for the scintillator forms columnar crystals. Therefore, a luminescent material may be inserted between the columnar crystals so that visible light with a specific wavelength can be applied in the transverse direction to the cesium iodide crystals constituting the scintillator. Specifically, for example, a frame partitioned into small blocks is placed on the undercoat layer 74, on which cesium iodide crystals are to be grown, and then cesium iodide crystals are grown under normal conditions. After the crystals are grown with a certain length, the frame is removed, so that cesium iodide crystals are grown along the blocks of the frame and spaces are formed between parts corresponding to the blocks. The spaces are filled with a quenching material, so that visible light with a specific wavelength can be applied in the transverse direction to the cesium iodide crystals from the quenching material, which is deposited parallel to the direction of the cesium iodide crystal growth, when light is emitted from the quenching material or the light source.

In addition, columnar crystals of cesium iodide are difficult to grow densely. Using this nature, visible light with a specific wavelength can be allowed to penetrate between grown columnar crystals of cesium iodide and applied to the cesium iodide crystals (scintillator) in the transverse direction of the cesium iodide crystals.

With or without the provision of the above bright burn-erasing layer (such as the light guide layer 73), luminescent properties may be imparted to an existing layer on a support 75, such as the undercoat layer 74, a fluorescent material-protecting layer 78, or an optical compensation layer 71, or the housing 2 so that it can serve to erase bright burn.

A photoelectric transducer layer 72 is formed on the surface of the light guide layer 73 to detect the fluorescence emitted from the scintillator 3.

The light source 77 may be of any type capable of applying visible light with a specific wavelength to the scintillator 3 through the light guide layer. Examples of the light source 77 include photo-/cathode-luminescence devices (PL/CL, e.g., fluorescent lights, PDPs, cathode ray tubes, and blue scintillation luminescence materials), electroluminescence devices (EL, e.g., inorganic and organic EL devices, light-emitting diodes, and laser diodes), chemiluminescence devices, and bioluminescence devices. Particularly in an embodiment of the present invention, LED light emitting devices are preferably used. Thus, the apparatus is so configured that when the light source 77 is turned on, light with a specific wavelength is introduced into the light guide layer 73 and then applied to the scintillator 3.

A structure having light sources installed in a cassette has been mainly described above. However, the light source does not always have to be placed in a cassette. The light source may be placed in a cradle, and the light may be applied to the scintillator through a light guide disposed in the cradle and through a light guide provided in the cassette.

In an embodiment of the present invention, the light sources are formed so as to receive electric power from the battery 24 installed in the radiographic imaging device 1. For example, however, when the radiographic imaging device 1 is used for non-destructive testing, it is less necessary to use such a compact structure for the apparatus 1. In some cases, the radiographic imaging device 1 does not have any battery installed. In such cases, electric power may be supplied from outside the radiographic imaging device 1.

A photoelectric transducer layer 72 is further disposed on the light guide layer 73 formed on the board 4. When X-rays are applied in the radiation direction R and converted to visible light in the layer of the scintillator 3, the photoelectric transducer layer 72 detects the visible light and converts the visible light to electrical signals.

Figure 4:
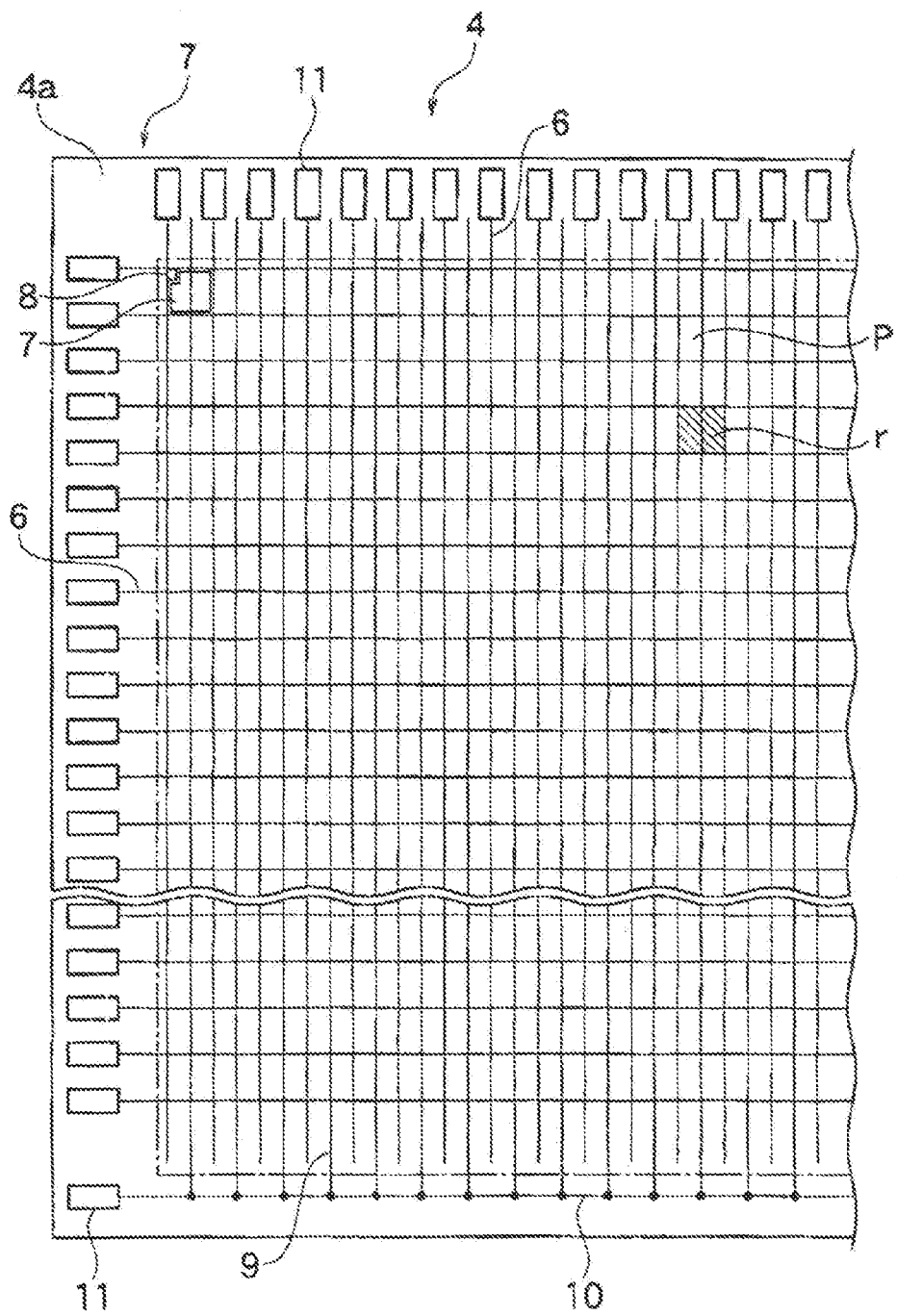
FIG. 4 is a plan view showing the configuration of the radiographic imaging device.

In many cases, the board 4 includes a glass board and has the photoelectric transducer layer 72 formed thereon. As shown in FIG. 4, the photoelectric transducer layer 72 includes a plurality of scanning lines 5 and a plurality of signal lines 6, which are arranged to intersect one another on the surface 4a of the board 4 with the light guide layer 73 interposed therebetween. The surface 4a is the photoelectric transducer layer 72-side surface facing the scintillator 3. A visible light detecting element 7 is provided in each of small regions r defined by the plurality of scanning lines 5 and the plurality of signal lines 6 on the surface 4a of the board 4.

The whole of the small regions r that are defined by the scanning lines 5 and the signal lines 6 and have the visible light detecting elements 7 two-dimensionally arranged, namely, the regions indicated by the alternate long and short dash lines in FIG. 4, forms a detection unit P.

Figure 5:
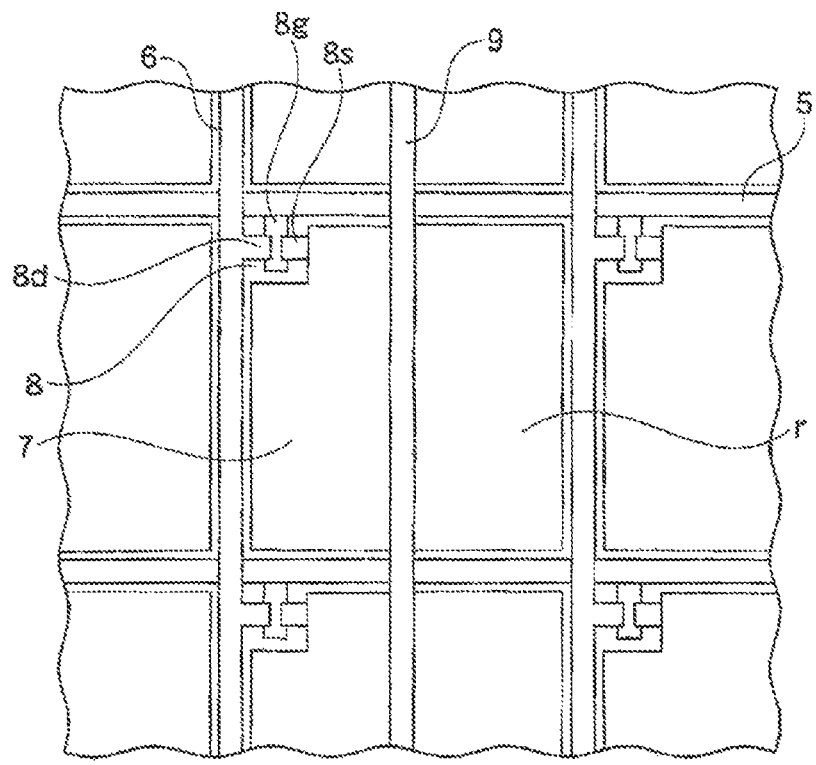
FIG. 5 is an enlarged view showing, in an enlarged manner, a structure including a radiation detecting element, a TFT, and other components formed in a small region on a board shown in FIG. 4.

In an embodiment of the present invention, a photodiode is used as the visible light detecting element 7. Alternatively, for example, a phototransistor or the like may be used as the visible light detecting element 7. As shown in FIG. 5, which is an enlarged view of FIG. 4, each visible light detecting element 7 is connected to the source electrode 8s of a TFT 8 as switching unit. The drain electrode 8d of the TFT 8 is connected to the signal line 6. It will be understood that an organic TFT may be used as the switching unit in an embodiment of the present invention, and hereinafter, "organic TFT" and "TFT" will be interchangeably used. A complementary metal oxide semiconductor (CMOS) may also be disposed in place of the TFT. As used herein, the term "CMOS" refers to a gate structure having metal-oxide-semiconductor field-effect transistors (MOSFETs) arranged in a complementary manner.

In an embodiment of the present invention, when TFTs are used, a protective layer is preferably formed to cover the source and drain electrodes provided on the upper surface of the semiconductor active layer. In this case, the protective layer is formed using $Ga_2O_3$, MgO, CaO, AlN, or the like so that it has a band gap higher than that of the semiconductor active layer. Specifically, when the semiconductor active layer is formed so as to contain In, Sn, Zn, Cd, or the like, the band gap of the semiconductor active layer can be controlled to 2.5 eV to less than 4.0 eV. In this case, the band gap of the protective layer is controlled in the range of 4.0 eV to 8.0 eV.

As mentioned above, organic TFTs may also be used as the TFT in an embodiment of the present invention.

The organic TFTs used in an embodiment of the present invention preferably have a field-effect transistor (FET) structure although they may have any type of structure. Usually, a field-effect transistor (FET) structure is used, except that an organic compound is used to form the semiconductor active layer. In this FET structure, the substrate is disposed as the lowermost layer, and the gate electrode is disposed on part of its upper surface. An insulating layer is placed to cover the gate electrode and to be in contact with part of the substrate where the gate electrode is not provided. The semiconductor active layer is provided on the upper surface of the insulating layer, and source and drain electrodes are disposed apart from each other on part of the upper surface of the semiconductor active layer. This structure is called a top-contact device. Alternatively, a bottom-contact device may be used in which source and drain electrodes are provided on the bottom of the semiconductor active layer.

The protective layer is preferably formed to cover the source and drain electrodes apart from each other. In this case, the protective layer is formed to have a band gap higher than that of the semiconductor active layer.

In this case, a p-type organic semiconductor material may be used to form the semiconductor active layer. The p-type organic semiconductor material is substantially colorless and transparent.

As used therein, the term "organic semiconductor material" refers to an organic material having semiconducting properties, and is intended to include p-type organic semiconductor materials that use holes as conducting carriers (also simply referred to as "p-type materials" or "hole-transporting materials") and n-type organic semiconductor materials that use electrons as conducting carriers (also simply referred to as "n-type materials" or "electron-transporting materials"), similarly to inorganic semiconductor materials. In general, p-type organic semiconductor materials often have better characteristics, and p-type transistors generally have higher operational stability under the atmosphere.

One of the characteristics of an organic thin film transistor is carrier mobility (also simply referred to as "mobility"), which is a measure of how easily carriers move through the organic semiconductor layer. In general, the mobility is preferably as high as possible, and preferably $1.0 \times 10^{-7}$ cm$^2$/Vs or more, more preferably $1.0 \times 10^{-6}$ cm$^2$/Vs or more, even more preferably $1.0 \times 10^{-5}$ cm$^2$/Vs or more, although it depends on the intended use. The mobility can be determined from the characteristics of the field-effect transistor (FET) device as prepared or by time-of-flight (TOF) method.

The p-type organic semiconductor materials may be low-molecular-weight materials or high-molecular-weight materials. Low-molecular-weight materials are preferably used. This is because low-molecular-weight materials can be purified by various purification methods such as sublimation, recrystallization, and column chromatography, can be easily made highly pure, and can form highly-ordered crystal structures because they have fixed molecular structures. The molecular weight of low-molecular-weight materials is generally from 100 to 5,000, preferably from 150 to 3,000, more preferably from 200 to 2,000.

Preferred examples of such p-type organic semiconductor materials are shown below. In the table shown below, Bu represents butyl, Pr propyl, Et ethyl, and Ph phenyl.

[Chemical formula 1]

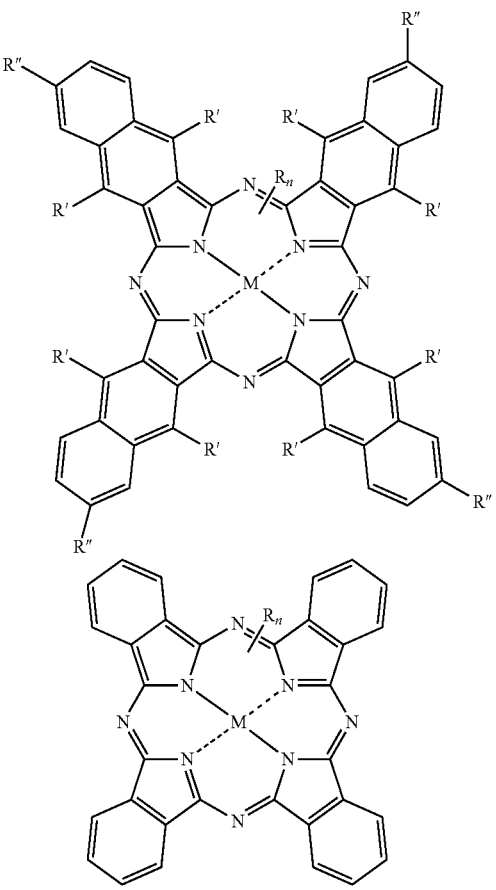

TABLE 1

| Compound | M | R | n | R' | R" |
|---|---|---|---|---|---|
| 1 | Si | OSi(n-Bu)$_3$ | 2 | H | H |
| 2 | Si | OSi(i-Pr)$_3$ | 2 | H | H |
| 3 | Si | OSi(OEt)$_3$ | 2 | H | H |
| 4 | Si | OSiPh$_3$ | 2 | H | H |
| 5 | Si | O(n-C$_8$H$_{17}$) | 2 | H | H |
| 6 | Ge | OSi(n-Bu)$_3$ | 2 | H | H |
| 7 | Sn | OSi(n-Bu)$_3$ | 2 | H | H |
| 8 | Al | OSi(n-C$_6$H$_{13}$)$_3$ | 1 | H | H |
| 9 | Ga | OSi(n-C$_6$H$_{13}$)$_3$ | 1 | H | H |
| 10 | Cu | — | — | O(n-Bu) | H |
| 11 | Ni | — | — | O(n-Bu) | H |
| 12 | Zn | — | — | H | t-Bu |
| 13 | V = O | — | — | H | t-Bu |
| 14 | H$_2$ | — | — | H | t-Bu |
| 15 | Si | OSiEt$_3$ | 2 | — | — |
| 16 | Ge | OSiEt$_3$ | 2 | — | — |
| 17 | Sn | OSiEt$_3$ | 2 | — | — |
| 18 | Al | OSiEt$_3$ | 1 | — | — |
| 19 | Ga | OSiEt$_3$ | 1 | — | — |

The structure of the organic thin film transistor may be the same as that of a common thin film transistor, except that an organic material such as any of those shown above is used to form the semiconductor intermediate layer.

All of these materials preferably have a visible or infrared light transmittance of 60% or more, more preferably 70% or more, even more preferably 80% or more.

The substrate used in this structure may be of any type having a necessary level of smoothness, such as glass, quartz, or an optically-transparent plastic film. Examples of optically-transparent plastics that may be used in this structure include polyethylene terephthalate (PET), polyethylene naphthalate (PEN), polyether sulfone (PES), polyether imide, polyether ether ketone, polyphenylene sulfide, polyarylate, polyimide, polycarbonate (PC), cellulose acetate (TAC), and cellulose acetate propionate (CAP). An organic or inorganic filler may be added to a film made of any of these resins. The substrate may preferably be a flexible substrate formed using aramid bio-nanofibers or the like.

The gate, source, and drain electrodes may be each made of any material having a necessary level of electrical conductivity. Examples of such a material include indium-doped tin oxide (ITO), indium-doped zinc oxide (IZO), $SnO_2$, antimony-doped tin oxide (ATO), ZnO, aluminum-doped zinc oxide (AZO), gallium-doped zinc oxide (GZO), $TiO_2$, fluorine-doped zinc oxide (FZO), electrically-conductive polymers such as poly(3,4-ethylenedioxythiophene)/polystyrene sulfonic acid (PEDOT/PSS), and carbon materials such as carbon nanotubes. These electrode materials can be formed into a film, for example, by vacuum deposition, sputtering, solution coating process, or other methods.

The insulating layer may be made of any material selected from materials having necessary insulating properties and the ability to be hardened. Examples of such a material include inorganic materials such as silicon dioxide, silicon nitride, and alumina, and organic materials such as polyester compounds (e.g., polyethylene naphthalate (PEN) and polyethylene terephthalate (PET)), polycarbonate, polyimide, polyamide, polyacrylate, epoxy resin, polyparaxylylene resin, novolac resin, polyvinyl alcohol (PVA), and polystyrene (PS). These insulating materials can be formed into a film, for example, by vacuum deposition, sputtering, solution coating process, or other methods.

In the organic TFT formed as described above, the gate and source electrodes are provided on the upper surface of the semiconductor active layer. The protective layer is preferably formed to cover the source and drain electrodes provided on the upper surface of the semiconductor active layer. In this case, the protective layer is formed to have a band gap higher than that of the semiconductor active layer.

For these TFTs or organic TFTs, reference may be made to JP 2010-186860 A and JP 2012-173276 A.

When an ON voltage is applied to the gate electrode 8g from a scanning drive unit 15 through the scanning line 5, the organic TFT or the TFT 8 is turned on to release the charges stored in the visible light detecting element 7 to the signal line 6 through the source and drain electrodes 8s and 8d. When an OFF voltage is applied to the gate electrode 8g through the connected scanning line 5, the TFT 8 is turned off so that the release of the charges from the visible light detecting element 7 to the signal line 6 is stopped and charges are retained in the visible light detecting element 7.

Figure 7:
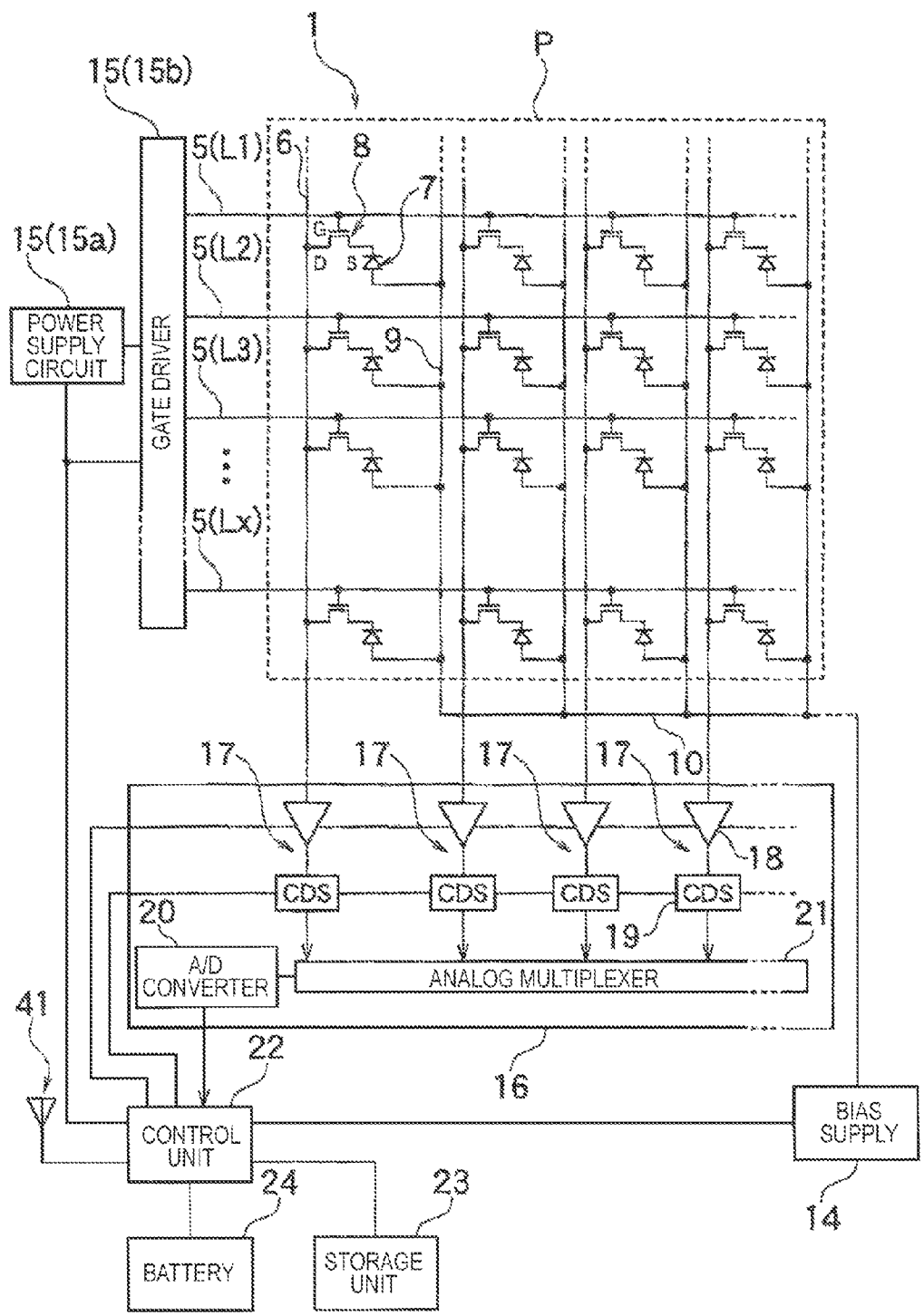
FIG. 7 is a circuit diagram showing an example of the circuit configuration of a radiographic imaging device according to an embodiment of the present invention.

In an embodiment of the present invention, as shown in FIG. 5, a plurality of visible light detecting elements 7 arranged in a row are each connected to a bias line 9, and as shown in FIG. 7, the bias lines 9 are connected together to a single connection 10 at a location outside the detection unit P on the board 4.

Figure 6:
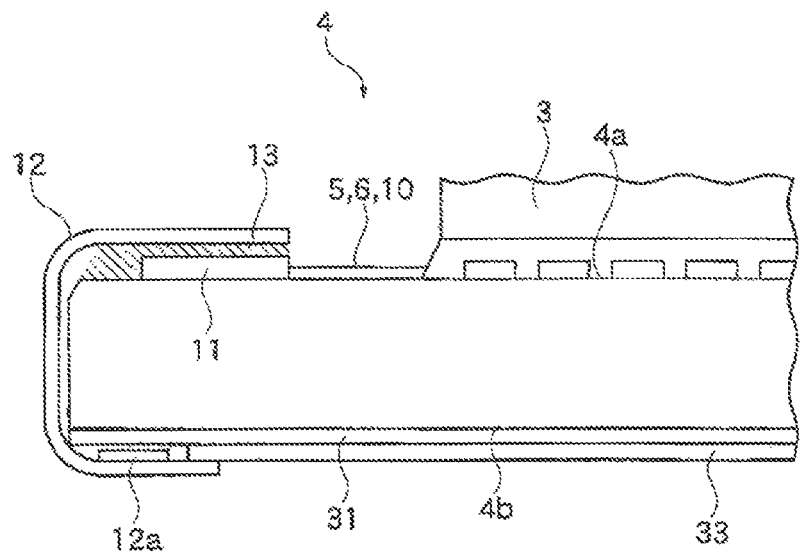
FIG. 6 is a side view illustrating a board provided with a COF, a PCB board, and other components.

As shown in FIG. 4, the scanning lines 5, the signal lines 6, and the connection 10 for the bias lines 9 are each connected to an input-output terminal (also referred to as a "pad") 11 provided in the vicinity of the edge of the board 4. As shown in FIG. 6, each input-output terminal 11 is connected through an anisotropic conductive material 13 such as an anisotropic conductive film or paste to a chip on film (COF) 12, a source-COF (S-COF), or a gate-COF (G-COF), in which a chip such as an IC 12a is incorporated.

As shown in FIG. 6, the COF 12 is provided to extend to the back side 4b of the board 4 and connected to the PCB board 33 on the back side 4b. In FIG. 6, the electronic components 32 and other components are omitted.

In an embodiment of the present invention, the support 75 as a component of the scintillator panel not only forms a member for playing a predominant role to hold a fluorescent material layer but also forms the fluorescent material layer. In an embodiment of the present invention, examples of the material used to form the support 75 include (1) carbon fiber reinforced plastics (CFRP), (2) carbon materials (such as amorphous carbon and materials produced by carbonizing charcoal and paper and binding products into a solid), (3) plastics, (4) glass, (5) metal (aluminum), and (6) materials produced by forming any of the materials (1) to (5) into a thin sheet and sandwiching the sheet between resin foams. Any of these materials may be used alone or in the form of a laminate.

A reflecting layer 76 is generally formed on the surface of the support 75. To reflect fluorescence, emitted from the scintillator 3, back to the photoelectric transducer layer 72 as a photosensitive layer, the reflecting layer 76 is made of a thin film of a metal such as aluminum, silver, aluminum alloy, or silver alloy, or a thin film including a binder and light-scattering particles dispersed therein. The light-scattering particles may be produced using, for example, a white pigment such as $TiO_2$ (anatase or rutile type), MgO, $PbCO_3.Pb(OH)_2$, $BaSO_4$, $Al_2O_3$, M(II)FX, wherein M(II) is at least one atom selected from Ba, Sr, and Ca, and X is a Cl or Br atom, $CaCO_3$, ZnO, $Sb_2O_3$, $SiO_2$, $ZrO_2$, lithopone ($BaSO_4.ZnS$), magnesium silicate, basic silicon sulfate, basic lead phosphate, or aluminum silicate. These white pigments have strong hiding power and high refractive index and thus can easily scatter the light emitted from the scintillator by reflection and refraction of the light to significantly improve the sensitivity of the resulting radiological image conversion panel.

An undercoat layer 74 is preferably formed on the surface of the reflecting layer 76. The undercoat layer 74 serves as a base for columnar crystals of the fluorescent material for the scintillator plate. The undercoat layer 74 can also improve the adhesion between the substrate and the fluorescent material layer.

Specifically, the undercoat layer 74 is made of an adhesion-promoting polymer, specifically, a polymer binder, examples of which include polyurethane, vinyl chloride copolymers, vinyl chloride-vinyl acetate copolymers, vinyl chloride-vinylidene chloride copolymers, vinyl chloride-acrylonitrile copolymers, butadiene-acrylonitrile copolymers, aramid, nylon, polyvinyl butyral, polyester, cellulose derivatives (such as nitrocellulose), styrene-butadiene copolymers, a variety of synthetic rubber resins, phenolic resin, epoxy resin, urea resin, melamine resin, phenoxy resin, silicone resin, acrylic resin, and urea-formamide resin. The glass transition temperature (Tg) of the binder is preferably 100° C. or lower in order to improve the adhesion between the substrate and the fluorescent material layer. If the binder material has a melting point, the melting point in the atmospheric pressure environment should preferably be 300° C. or lower in order to improve the adhesion between the substrate and the fluorescent material layer.

The undercoat layer 74 preferably has a thickness of 0.1 to 10 μm, more preferably 0.5 to 5 μm. When the undercoat layer has a thickness of 0.1 μm or more, it can have higher adhesion to the fluorescent material layer. When the undercoat layer has a thickness of 5 µm or less, light scattering can be suppressed in the undercoat layer 74, and sharpness can be improved.

The undercoat layer 74 may contain a pigment, a dye, or other materials so that the light emitted from the fluorescent material (scintillator) can be prevented from being scattered and sharpness and other properties can be improved.

The scintillator 3 including cesium iodide as described above can be formed by a process that includes heating a cesium iodide composition (which may contain an activator such a Tl) for the scintillator 3 under reduced pressure in an atmosphere of inert gas such as nitrogen or argon to vapor-deposit the composition on the surface of the undercoat layer 74. The thickness of the scintillator 3 formed in this manner, specifically, the thickness of the layer of the vapor-deposited cesium iodide columnar crystals is preferably from 100 to 800 µm, more preferably from 120 to 700 µm so that a good balance between properties such as brightness and sharpness can be achieved.

A fluorescent material-protecting layer 78 is usually formed on the surface of the scintillator 3. The fluorescent material-protecting layer 78 mainly aims to physically or chemically protect the fluorescent material layer. Cesium iodide (CsI) is highly moisture-absorbent. When remaining exposed to the air, therefore, cesium iodide (CsI) absorbs moisture in the air and undergoes deliquescence. Specifically, the fluorescent material-protecting layer 78 aims to prevent this. Therefore, the fluorescent material-protecting layer 78 is preferably made of a water-impermeable resin or the like. Such a resin may be, for example, polyparaxylene or the like.

In view of the balance between the protecting function and sharpness properties, the thickness of the fluorescent material-protecting layer 78 is generally from 3 to 20 µm, preferably 10 µm.

An optical compensation layer 71 may also be formed on the surface of the fluorescent material-protecting layer 78. The optical compensation layer 71 is usually made of a resin. In this case, for example, a thermosetting resin may be used to form the optical compensation layer 71. Such a thermosetting resin may be an acrylic resin, an epoxy resin, a silicone resin, or the like. In view of the balance between the interfacial adhesion and the sharpness, the thickness of the optical compensation layer 71 is generally from 5 to 30 µm, preferably from 10 to 20 µm.

An adhesive layer for bonding to a flat light-receiving device may also be provided on the protecting layer. To ensure adhesive strength, the adhesive layer preferably has a thickness of 10 µm or more, and the total thickness of the protecting layer and the adhesive layer is preferably 100 µm or less, more preferably 50 µm or less. Such a thickness is advantageous in that the light emitted from the scintillator can be prevented from being increasingly diffused in the space between the flat light-receiving device and the scintillator panel so that the sharpness of the flat panel detector can be prevented from being reduced.

In another mode, a hot-melt resin may be used to form the protecting layer. The hot-melt resin can also serve to bond the scintillator plate to the flat light-receiving device.

In an embodiment of the present invention, the hot-melt resin is an adhesive resin that contains neither water nor any solvent, is a solid at room temperature, and includes a non-volatile thermoplastic material. The hot-melt resin melts as its temperature increases, and the melt solidifies as its temperature decreases. The hot-melt resin has adhesive properties when melted by heating, and is a non-adhesive solid at room temperature.

In an embodiment of the present invention, a CMOS image sensor may be used instead of the light detecting element including a combination of the PD and the TFT described above.

In an embodiment of the present invention, a CCD image sensor may also be used instead of the light detecting element including a combination of the PD and the TFT described above.

The CMOS or CCD image sensor is highly useful for a small-sized radiographic imaging device.

A plurality of CMOS or CCD image sensors arranged in an array or matrix can be used for a large-sized radiographic imaging device.

A base 31 is disposed on the back side of the board 4 with a lead thin sheet 79 interposed therebetween. FIG. 3 is a plan view showing the back side of the radiographic imaging device 1 according to an embodiment of the present invention.

In an embodiment of the present invention, a plurality of readout ICs 16 are disposed at both short-side ends of the radiographic imaging device 1. A plurality of gate drivers 15*b* (gate ICs) are arranged along one long-side end of the radiographic imaging device 1.

Each readout IC 16 is connected through a signal interface board 32*a* to a control board 32*c* constituting a control unit 22 shown in FIG. 7. Each gate driver 15*b* (gate IC) is also connected through a gate interface board 32*b* to the control board 32*c*. This radiographic imaging device is further equipped with a source interface (SIF) board, a gate interface (GIF) board, a control (CTRL) board, and a power supply board.

The battery 24 disposed on the back side is rechargeable. The battery 24 may be, for example, a rechargeable secondary battery such as a nickel-cadmium battery, a nickel-hydrogen battery, a lithium-ion battery, a small sealed lead-acid battery, or a lead storage battery, or an electric storage device such as a lithium-ion capacitor (LIC) or an electric double-layer capacitor.

In particular, a lithium-ion capacitor is preferably used in an embodiment of the present invention because it has high storage efficiency and can be charged fast with a large current (e.g., 5-10 amperes) so that the recharge time can be significantly reduced. In other words, the charging time is almost inversely proportional to the intensity of the charging current, and therefore, if the charging current is increased, the charging time can be reduced correspondingly.

The battery 24 is connected to the power supply board 32*d* and so disposed that the value of the current supplied to the battery 24 during charging, the power supplied to each functional unit, and other factors are controllable.

Next, the circuit configuration of the radiographic imaging device 1 will be described using FIG. 7.

As shown in FIG. 7, one electrode of each radiation detecting element 7 is connected to a bias line 9, and the bias lines 9 are connected together to a connection 10 and to a bias supply 14. The bias supply 14 is configured to supply a bias voltage (reverse bias voltage in FIG. 7) to an electrode of each radiation detecting element 7 through the connection 10 and each bias line 9.

Another electrode of each radiation detecting element 7 is connected to the source electrode 8*s* (represented by S in FIG. 7) of the TFT 8. The gate electrode 8*g* (represented by G in FIG. 7) of each TFT 8 is connected to each (L1 to Lx) of the scanning lines 5 extending from a gate driver 15*b* of a scanning drive unit 15. The drain electrode 8*d* (represented by D in FIG. 7) of each TFT 8 is connected to each signal line 6.

The scanning drive unit 15 includes a power supply circuit 15*a* for supplying an ON or OFF voltage to the gate driver 15*b* and the gate driver 15*b* for switching the voltage applied to each (L1 to Lx) of the scanning lines 5 between the ON and OFF voltages. As mentioned above, the gate driver 15*b* is configured to switch, between the ON and OFF voltages, the voltage applied to the gate electrode 8*g* of the TFT 8 through each (L1 to Lx) of the scanning lines 5 so that each TFT 8 can be controlled ON and OFF.

Each signal line 6 is connected to each readout circuit 17 formed in the readout IC 16. The readout circuit 17 includes an amplifier circuit 18, a correlated double sampling (CDS) circuit 19, an analog multiplexer 21, and an A/D converter 20.

In radiographic imaging, for example, radioactive rays passing through an object is applied to the radiographic imaging device 1 and converted by the scintillator 3 to an electromagnetic wave with a wavelength different from that of the radioactive rays. The electromagnetic wave is then applied to the radiation detecting element 7 immediately below the scintillator 3. The radiation detecting element 7 then generates charges (electrical signals) depending on the quantity of the applied radiation (the quantity of the electromagnetic wave).

Charges are read out of each radiation detecting element 7. In this process, an ON voltage is applied from the gate driver 15*b* of the scanning drive unit 15 to the gate electrode 8*g* through each (L1 to Lx) of the scanning lines 5 so that the TFT 8 is turned on and charges are released from the radiation detecting element 7 to the signal line 6. A voltage value is then output from the amplifier circuit 18 depending on the quantity of the charges released from the radiation detecting element 7. The voltage value is subjected to correlated double sampling by the correlated double sampling circuit 19 so that analog image data is output to the multiplexer 21. Image data sequentially output from the multiplexer 21 is converted to digital image data by the A/D converter 20 and output to and stored in the storage unit 23 sequentially.

The control unit 22 may be a computer including a central processing unit (CPU), a read only memory (ROM), a random access memory (RAM), an I/O interface, and other components connected to a bus, or may include a field programmable gate array (FPGA) and other components. Alternatively, the control unit 22 may include a dedicated control circuit.

The control unit 22 is allowed to control the operation of each component of the radiographic imaging device 1. Each radiation detecting element 7 is reset, or charges are read out from each radiation detecting element 7, and the radiographic imaging device 1 is allowed to stand with no radioactive rays applied thereto so that the offset correction value is calculated. After these steps, each processing is performed such as reading out dark charges, which are accumulated in each radiation detecting element 7, similarly to the readout processing.

The control unit 22 is connected to a storage unit 23 including a dynamic RAM (DRAM) and other components and to the battery 24 for supplying power to each functional unit of the radiographic imaging device 1.

The control unit 22 is also connected to the antenna device 41 and to the light sources, the power switch, the selecting switch, the connector, and other components although not shown in FIG. 7.

When an operator such as a radiographer turns on the selecting switch 38, the control unit 22 sends a selection signal to the console through the antenna device 41 to indicate the selection of the unit itself. When the radiographic imaging device 1 is inserted into the cradle, the connector 39 is connected to the connector of the cradle, so that the control unit 22 sends, to the cradle, information such as cassette ID, which is information for identifying the radiographic imaging device 1 itself.

When the connector 39 is connected to the connector of a notification unit (not shown), the control unit 22 obtains, from the notification unit, information such as bucky ID, which is information for identifying a bucky unit, and sends the bucky ID and the cassette ID of the radiographic imaging device 1 to the console.

When the radiographic imaging device 1 is operated as described above repeatedly, a type of ghost, called bright burn, occurs in an image formed.

If a visible image formed in the radiographic imaging device 1 is once output, no electricity should remain in the radiographic imaging device 1. In fact, however, brightness slightly increases at a part where an image is formed, which appears like a ghost in a new image. This is bright burn. It is conceivable that such bright burn can occur because carriers captured by slightly deeper traps can remain in the scintillator at the part where an image has been previously formed. Bright burn disappears as time elapses. However, waiting for such spontaneous disappearance makes serial radiography impossible.

In an embodiment of the present invention to erase such bright burn, visible light having an intensity peak at a wavelength in the range of 405 nm to 500 nm, preferably in the range of 410 nm to 490 nm is applied to the scintillator 3 installed in the radiographic imaging device 1 as described above.

In an embodiment of the present invention, the wavelength spectrum of the light applied to erase bright burn generally has a half-width of ±3 nm or less, preferably ±2 nm or less.

When visible light having an intensity peak at a wavelength in the above range is applied, carriers captured by deeper traps in the scintillator can be re-excited to undergo a light emission or heat loss process, so that bright burn can be erased. Particularly in an embodiment of the present invention, when visible light having a maximum peak wavelength in the range of 410 nm to 490 nm is applied, uniform light emission and uniform attenuation of light emission can be achieved, so that the above advantageous effect can be obtained significantly.

There are many studies particularly about the use of thallium as an activator in a scintillator including cesium iodide crystals as a host material, which may be used in an embodiment of the present invention. Taking the results of these studies into account, it is possible to show, as follows, why the wavelength range should have an upper limit of 500 nm in an embodiment of the present invention.

L. A. Kappers, R. H. Bartram, D. S. Hamilton, A. Lempicki, C. Brecher, V. Gaysinskiy, E. E. Ovechkina, S. Thacker, V. V. Nagarkar, "A tunnering model for afterglow suppression in CsI:Tl,Sm scintillation materials", Radiat. Meas., 45(3-6), p 426-(2009) shows in FIG. 1 the valence band of cesium iodide activated with thallium and samarium. From FIG. 1, it is easy to see that the energy level difference (band gap) between the valence band and the conduction band of cesium iodide crystal is about 6.2 eV. Hereinafter, this difference will be referred to as [1].

M. A. H. Chowdhury, A. Holmes-Siedle, A. K. McKemey, S. J. Watts, D. C. Imrie, "Radiation effects in CsI(Tl) crystals from a controlled growth process", Nucl. Inst. and Meth. in Phys. Res. A, 413, p 471-(1998) shows that the spectrum of absorption derived from the level of a defect called F-center in cesium iodide has a peak wavelength in the range of 355 nm to 560 nm. The energy of an electromagnetic wave with a certain wavelength is calculated from the formula: $E=h\nu=hc/\lambda$ (h: Planck constant, $\nu$: the frequency of the electromagnetic wave, c: the velocity of light, λ: the wavelength of the electromagnetic wave). It is therefore apparent that the electromagnetic wave with the above peak wavelength has an energy of 2.21 to 3.49 eV. This energy corresponds to the energy level difference between the valence band of cesium iodide and the level of the F-center defect. Hereinafter, this difference will be referred to as [2].

Ken-ichi KAN'NO and Tamao MATSUMOTO, "Intrinsic Luminescence from Relaxed States of Excitons in Alkali Halide Crystals," Journal of JSSRR, Vol. 4, No. 4, p. 31 (1991) suggests that the bright burn effect can occur because when generated in crystals by X-ray irradiation, electrons and holes are trapped at F- and H-centers, respectively, in the crystals, so that the electron-hole recombination necessary for light emission is inhibited. In this process, electrons are trapped at F-center whose energy level is much lower than that of the conduction band. In order to allow the electrons to escape from the F-center and to recombine with holes again, therefore, it is necessary to obtain energy corresponding to the difference between the levels of the conduction band and the F-center defect. This energy difference can be calculated from [1] and [2](as [1]−[2]).

In the case of cesium iodide activated with thallium, [1]−[2] is 2.71 to 3.99 eV, which corresponds to the energy of an electromagnetic wave with a wavelength of 311 nm to 457 nm calculated from $E=h\nu=hc/\lambda$. To release electrons from F-center so that bright burn can be suppressed, therefore, it is necessary to apply an electromagnetic wave with a wavelength of about 450 nm or less (corresponding to an energy of 2.75 eV or more).

The foregoing explanation does not take into account the "tunnel effect" or the "thermal effect on vibrational level." Practically, these effects need to be taken into account. Hereinafter, these effects will be specifically discussed.

The tunnel effect is a phenomenon in which if a potential barrier between adjacent atoms is thin enough, electrons tunnel though the barrier without surmounting it, so that electron transfer occurs. It is known that the probability of the tunnel effect increases as the barrier becomes thin or as the energy level difference from the conduction band decreases. Even if the supplied energy is lower than the difference between the conduction band and the F-center defect level, the tunnel effect can be used in combination to transfer electrons like free electrons.

A configuration coordinate model is shown in Katsuaki SATO, "Applied Physics Series, Application of Physical Properties," edited by the Japan Society of Applied Physics, Ohmsha Ltd., p. 132 (1991). If this configuration coordinate model is used to interpret the process of light emission, the transition does not always occur at the bottom of the potential curve and can occur between lattice vibrational levels, which change with thermal energy. Therefore, the above energy level difference is not always necessary to allow electrons to escape, depending on the potential curve overlap between ground and excited states.

As a result of earnest study, the inventors have found that an electromagnetic wave with smaller energy (a longer wavelength) than that of 450 nm light, specifically, light with a wavelength of up to 500 nm is effective in erasing bright burn. This may be because of the tunnel effect and the thermal effect on vibrational level described above.

However, the application of light with a central wavelength shorter than 405 nm can cause a reduction in the sensitivity of the formation of images. Although the reason for this is not clear, some changes seem to occur in the scintillator to which light with a wavelength shorter than 405 nm is applied, and the rate of downward change in its sensitivity is significantly high. The results in Table 2 show that bright burn disappears when bright burn-erasing light with a central wavelength of 405 to 500 nm is applied.

In an embodiment of the present invention, the bright burn-erasing method includes applying the bright burn-erasing light to the radiographic imaging device with a bright burn-erasing function for a period of time generally in the range of 1 milliseconds to 5 seconds, preferably in the range of 100 milliseconds to 1 second. When the bright burn-erasing light is applied for the above period of time, bright burn can be almost completely erased.

The bright burn-erasing light generally has an irradiance in the range of $0.1\ \mu W/cm^2$ to $1\ mW/cm^2$, preferably in the range of $1\ \mu W/cm^2$ to $0.1\ mW/cm^2$. Such an irradiance is enough for the application of light to erase bright burn.

In the bright burn-erasing method according to an embodiment of the present invention, light with an intensity peak wavelength in the specified range may be applied to the scintillator by any suitable method. Methods for applying the light can be broadly divided into a method of applying the bright burn-erasing light from inside, specifically, from unit for producing the bright burn-erasing light, which is disposed inside the fluorescent material layer, and a method of applying the bright burn-erasing light from outside the fluorescent material.

Using the method mentioned above, a bright burn-erasing medium may be vertically packed into the space between the fluorescent material columns. In this case, the bright burn-erasing light can be applied in the lateral direction to the columnar crystals of the fluorescent material.

Alternatively, for example, a light guide layer may be provided above and/or below the columnar crystals of the fluorescent material, and the bright burn-erasing light may be applied from above and/or below the columnar crystals of the fluorescent material through the light guide layer.

Alternatively, instead of the light guide layer specifically provided as described above, the housing, the substrate, the undercoat layer, the optical compensation layer, the cushion member, the support, the reflecting layer, the anti-corrosion layer, the optical coupling layer, the bus layer, or the like may be used to emit and apply the bright burn-erasing light.

Medical field applications of the bright burn-erasing method of the present invention have been mainly described above. However, the method of the present invention is not restricted to the medical field, and can be used other fields using X-ray images, such as the field of non-destructive testing.

EXAMPLES

Next, the present invention will be more specifically described with reference to examples, which however are not intended to limit the present invention.

Some terms used in the examples and the comparative examples shown below have the meanings shown below.

<Erasing Light Wavelength>

The erasing light wavelength is the maximum-intensity wavelength of the spectrum obtained using a combination of an LED light source and a wavelength-selecting filter. The half-width of the spectrum is ±2 nm.

<Sensitivity Increase Rate>

The sensitivity increase rate is the rate of change in the panel sensitivity when 30R X-rays at a tube voltage of 80 kVp are applied to the panel. When the sensitivity does not change before and after the application of X-rays, the sensitivity increase rate is determined to be 0%. If bright burn occurs, the sensitivity increase rate will increase. The fact that the sensitivity increase rate is 0% means that bright burn is erased.

<Light Resistance of Scintillator>

The light resistance of the scintillator is the rate of change in the panel sensitivity when the erasing light wavelength is applied under the conditions of an intensity of 1.0 mW/cm² and 24 hours. In this case, the panel sensitivity is the signal value per unit radiation dose (Count/mR), which is obtained under the X-ray irradiation conditions according to RQA5 (IEC61267). The rate of change in the panel sensitivity is determined from the value.

Comparative Example 1

<Example of Applying Light with a Maximum Intensity Wavelength of 400 nm>

As shown in FIGS. 2 and 3, signal interface boards 32a, a gate interface board 32b, a control board 32c, a power supply board 32d, a battery 24, and other components were disposed on one surface of a base 31, and a 300-μm-thick lead thin sheet 79 was disposed on the other surface of the base 31.

Separately, a glass board 4 was provided to be disposed on the lead thin sheet 79 placed on the base 31.

A reflecting layer 76, a light guide layer 73, and a photoelectric transducer layer 72 were stacked in this order on the surface of the glass board 4.

The reflecting layer 76 used was a 100-μm-thick aluminum foil. A 400-μm-thick polycarbonate layer was formed as the light guide layer 73, and LED light-emitting devices were disposed as light sources 77 at the ends of the polycarbonate layer.

As shown in FIG. 4, a plurality of scanning lines and a plurality of signal lines were arranged in the photoelectric transducer layer 72, in which small regions defined by the scanning lines and the signal lines corresponded to visible light detecting elements 7, respectively. Each visible light detecting element 7 was connected to the source electrode of a TFT. The drain and gate electrodes of the TFT were connected to the signal and scanning lines, respectively.

A polyester undercoat layer 74 was then formed on an aluminum support 75. Columnar crystals of thallium-activated cesium iodide (cesium iodide doped with 0.5% by mole of thallium) were grown with an average height of 500 μm on the surface of the undercoat layer to form a scintillator 3.

A 10-μm-thick polyparaxylylene layer was formed as a fluorescent material-protecting layer 78 on the surface of the scintillator made of the thallium-activated cesium iodide columnar crystals. A 20-μm-thick hot-melt resin layer was then formed as an optical compensation layer 71 on the surface of the fluorescent material-protecting layer.

As shown in FIG. 2, the glass board 4, on which the layers were stacked, respectively, as described above, was disposed on the lead thin sheet 79, so that the layered structure including the scintillator 3 was disposed thereon. The resulting structure was disposed in a ready-made housing 2 for a radiographic imaging device in such a manner that a shock absorber 36 was disposed between the structure and the housing 2 so that the side of the structure was not in direct contact with the inner wall of the housing 2. All necessary wiring was provided, so that the radiographic imaging device (panel) shown in FIG. 1 was obtained.

An object to be imaged was placed on the front surface of the panel. Radiographic images of the object were taken with X-rays applied at a tube voltage of 80 kVp to the panel, and converted into electronic signals for fluorescent images via the scintillator.

The panel was then attached to a cradle, and the electronic signals for fluorescent images formed in the panel were stored in a storage device via the cradle.

After the panel was used in this way, visible light with a maximum intensity wavelength of 400 nm (whose spectrum had a half-width of ±2 nm) was applied from the light source to the scintillator of the panel for 0.5 seconds, using the filter placed in advance. The bright burn-erasing light had an irradiance of 10 μW/cm². How much the sensitivity of the panel increased was also measured.

Table 2 shows the results.

Example 1

<Example of Applying Light with a Maximum Intensity Wavelength of 405 nm>

To erase bright burn, the same process was used as in Comparative Example 1, except that visible light with a maximum intensity wavelength of 405 nm (whose spectrum had a half-width of ±2 nm) was applied instead, using the filter. The bright burn-erasing light was applied with the same irradiance for the same period of time as in Comparative Example 1. How much the sensitivity of the panel increased was also measured.

Table 2 shows the results.

Example 2

<Example of Applying Light with a Maximum Intensity Wavelength of 430 nm>

To erase bright burn, the same process was used as in Comparative Example 1, except that visible light with a maximum intensity wavelength of 430 nm (whose spectrum had a half-width of ±2 nm) was applied instead, using the filter. The bright burn-erasing light was applied with the same irradiance for the same period of time as in Comparative Example 1. How much the sensitivity of the panel increased was also measured.

Table 2 shows the results.

Example 3

<Example of Applying Light with a Maximum Intensity Wavelength of 450 nm>

To erase bright burn, the same process was used as in Comparative Example 1, except that visible light with a maximum intensity wavelength of 450 nm (whose spectrum had a half-width of ±2 nm) was applied instead, using the filter. The bright burn-erasing light was applied with the same irradiance for the same period of time as in Comparative Example 1. How much the sensitivity of the panel increased was also measured.

Table 2 shows the results.

Example 4

<Example of Applying Light with a Maximum Intensity Wavelength of 500 nm>

To erase bright burn, the same process was used as in Comparative Example 1, except that visible light with a maximum intensity wavelength of 500 nm (whose spectrum had a half-width of ±2 nm) was applied instead, using the filter. The bright burn-erasing light was applied with the same irradiance for the same period of time as in Comparative Example 1. How much the sensitivity of the panel increased was also measured.

Table 2 shows the results.

Comparative Example 2

<Example of Applying Light with a Maximum Intensity Wavelength of 550 nm>

To erase bright burn, the same process was used as in Comparative Example 1, except that visible light with a maximum intensity wavelength of 550 nm (whose spectrum had a half-width of ±2 nm) was applied instead, using the filter. The bright burn-erasing light was applied with the same irradiance for the same period of time as in Comparative Example 1. How much the sensitivity of the panel increased was also measured.

Comparative Example 3

<Example of Applying Light with a Maximum Intensity Wavelength of 400 nm and a Half-Width of ±100 nm>

To erase bright burn, the same process was used as in Comparative Example 1, except that visible light with a maximum intensity wavelength of 400 nm, whose spectrum had a half-width of ±100 nm, was applied instead, using the filter. The bright burn-erasing light was applied with the same irradiance for the same period of time as in Comparative Example 1. How much the sensitivity of the panel increased was also measured.

Comparative Example 4

<Example of Applying Light with a Maximum Intensity Wavelength of 400 nm and a Half-Width of ±50 nm>

To erase bright burn, the same process was used as in Comparative Example 1, except that visible light with a maximum intensity wavelength of 400 nm, whose spectrum had a half-width of ±50 nm, was applied instead, using the filter. The bright burn-erasing light was applied with the same irradiance for the same period of time as in Comparative Example 1. How much the sensitivity of the panel increased was also measured.

Table 2 shows the results.

TABLE 2

| | Erasing light wavelength (nm) | | Sensitivity increase rate | Light resistance of scintillator |
|---|---|---|---|---|
| | (nm) | Half-width | | |
| Comparative Example 1 | 400 | ±2 | 0% | −12% |
| Example 1 | 405 | ±2 | 0% | −3% |
| Example 2 | 430 | ±2 | 0% | −2% |
| Example 3 | 450 | ±2 | 0% | −2% |
| Example 4 | 500 | ±2 | 4% | 0% |
| Comparative Example 2 | 550 | ±2 | 8% | 0% |
| Comparative Example 3 | 400 | ±100 | 0% | −15% |
| Comparative Example 4 | 400 | ±50 | 0% | −13% |

The following is apparent from Table 2. When the visible light applied has a maximum intensity wavelength of 400 nm, which is less than 405 nm specified in the present invention, the light resistance of the scintillator decreases although bright burn is erased. Also when the visible light applied contains a component with a wavelength of 400 nm or less, the light resistance of the scintillator decreases although bright burn is erased. When the visible light applied has a maximum intensity wavelength of 550 nm, which is more than 500 nm specified in the present invention, bright burn is not erased.

According to the above embodiment of the present invention, the bright burn effect can be erased by applying specific visible light to a scintillator, and the sensitivity of the scintillator can be effectively prevented from decreasing even though such visible light with a specific wavelength is applied to the scintillator.

In other words, bright burn can be erased by applying, to a scintillator, visible light having an intensity peak wavelength in the specified range. If ultraviolet light is applied to the scintillator, the scintillator would decrease in sensitivity. However, the present invention uses visible light rather than ultraviolet light, and such visible light will not reduce the sensitivity of the scintillator when applied to the scintillator.

Such effective visible light should have an intensity peak at a wavelength in the range of 405 nm to 500 nm, preferably in the range of 410 nm to 490 nm, which is a very narrow range. If the intensity peak wavelength is out of the range, the two advantageous effects, erasing of bright burn and prevention of a reduction in the sensitivity of the scintillator, cannot be achieved at the same time.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A method for erasing bright burn, comprising:
applying, to a scintillator, visible light having an intensity peak at a wavelength in the range of 405 nm to 500 nm,
wherein the scintillator comprises cesium iodide and is provided in a radiographic imaging device having a photoelectric transducer.

2. The method according to claim 1, wherein the radiographic imaging device comprises the scintillator comprising cesium iodide, the photoelectric transducer, and a unit adapted to generate bright burn-erasing light.

3. The method according to claim 1, wherein the light applied to erase bright burn has the intensity peak at a wavelength in the range of 410 nm to 490 nm.

4. The method according to claim 1, wherein the light applied to erase bright burn is free of light components with a wavelength of at most 400 nm.

5. The method according to claim 1, wherein the light is applied for a period of time in the range of 1 millisecond to 5 seconds to erase bright burn.

6. The method according to claim 1, wherein the light applied to erase bright burn has an irradiance in the range of 0.1 $\mu W/cm^2$ to 1 $mW/cm^2$.

7. The method according to claim 1, wherein the step of applying is performed by a bright burn-erasing unit comprising a light guide layer with light sources arranged at ends of the light guide layer.

8. A radiographic imaging device with a bright burn-erasing function, the device comprising:
a scintillator comprising cesium iodide;
a photoelectric transducer configured to detect light emitted from the scintillator and to convert the light to an electrical signal; and
a bright burn-erasing unit arranged to apply, to the scintillator, visible light having an intensity peak at a wavelength in the range of 405 nm to 500 nm.

9. The device according to claim 8, wherein the light applied to erase bright burn has the intensity peak at a wavelength in the range of 410 nm to 490 nm.

10. The device according to claim 8, wherein the light applied to erase bright burn is free of light components with a wavelength of at most 400 nm.

11. The device according to claim 8, wherein the light is applied for a period of time in the range of 1 millisecond to 5 seconds to erase bright burn.

12. The device according to claim 8, wherein the light applied to erase bright burn has an irradiance in the range of 0.1 $\mu W/cm^2$ to 1 $mW/cm^2$.

13. The device according to claim 8, wherein the scintillator, the photoelectric transducer, and the bright burn-erasing unit are arranged as layers with the photoelectric transducer arranged between the scintillator and the bright burn-erasing unit.

14. The device according to claim 8, wherein the bright burn-erasing unit comprises a light guide layer with light sources arranged at ends of the light guide layer, the photoelectric transducer being formed on a surface of the light guide layer.

\* \* \* \* \*